United States Patent
Gurvich et al.

(10) Patent No.: US 11,407,165 B2
(45) Date of Patent: Aug. 9, 2022

(54) METHODS OF MAKING COMPONENTS

(71) Applicant: Hamilton Sundstrand Corporation, Charlotte, NC (US)

(72) Inventors: Mark R. Gurvich, Middletown, CT (US); Georgios S. Zafiris, Glastonbury, CT (US); Joyel M. Schaefer, Earlville, NY (US); Brayton Reed, Rome, NY (US); Michael King, Sauquoit, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 617 days.

(21) Appl. No.: 16/247,928

(22) Filed: Jan. 15, 2019

(65) Prior Publication Data

US 2020/0223124 A1    Jul. 16, 2020

(51) Int. Cl.
| | | |
|---|---|---|
| *B29C 57/04* | (2006.01) | |
| *B29C 53/30* | (2006.01) | |
| *B29D 23/00* | (2006.01) | |
| *F16C 3/02* | (2006.01) | |
| *F16D 3/72* | (2006.01) | |

(52) U.S. Cl.
CPC .............. *B29C 57/04* (2013.01); *B29C 53/30* (2013.01); *B29D 23/001* (2013.01); *F16C 3/026* (2013.01); *F16D 3/725* (2013.01); *F16C 2326/06* (2013.01); *F16C 2326/43* (2013.01)

(58) Field of Classification Search
CPC ................................. B29C 57/04; B29C 53/30
See application file for complete search history.

(56) References Cited

U.S. PATENT DOCUMENTS

| | | | |
|---|---|---|---|
| 4,006,599 A * | 2/1977 | Hegler | ................. B26F 1/0038 |
| | | | 405/49 |
| 4,014,184 A | 3/1977 | Stark | |
| 4,113,813 A | 9/1978 | Wilson | |
| 4,173,128 A | 11/1979 | Corvelli | |
| 4,687,432 A | 8/1987 | Cross et al. | |
| 2004/0216553 A1 | 11/2004 | Kirmsse | |
| 2012/0283029 A1 | 11/2012 | Lawrie | |

FOREIGN PATENT DOCUMENTS

| | | |
|---|---|---|
| DE | 19523723 A1 | 1/1997 |
| EP | 2878435 B1 | 7/2018 |
| JP | S58131036 A | 8/1983 |
| JP | 2010053937 A | 3/2010 |
| JP | 2017003091 A | 1/2017 |

OTHER PUBLICATIONS

Translation of JP2017003091A, 2015 (Year: 2015).*
Translation of DE19523723A, 1995 (Year: 1995).*
European Search Report for EP Application No. 19210654.0 dated Jun. 9, 2020.

* cited by examiner

*Primary Examiner* — Alison L Hindenlang
*Assistant Examiner* — Asha A Thomas
(74) *Attorney, Agent, or Firm* — Carlson, Gaskey & Olds, P.C.

(57) ABSTRACT

A method of forming a component having grooves formed into an outer surface of a component includes the steps of applying at least one mold to an outer surface of a component preform. The mold is forced into contact with the outer surface to form a detent into the outer surface.

15 Claims, 11 Drawing Sheets

METHODS OF MAKING COMPONENTS

BACKGROUND

A method of forming a component.

Drive shafts are utilized in any number of applications. Typically, a drive shaft connects a source of drive to an item to be driven. Drive shafts are utilized in aerospace applications. One particular application is to drive propellers such as are associated with a helicopter. It is known that the drive shaft input might become misaligned with the drive shaft output during operation. Thus, some flexibility is desirable along the drive shaft.

Drive shafts have historically been provided as a single tubular member with flexible diaphragms at each end to allow for some flexibility between the input and the output.

It is also known, as an alternative (or in addition) to the use of diaphragms, to utilize grooves which extend across 360° on the shaft to provide for the flexibility. A similar concept has been utilized from outwardly extending bumps on the drive shaft.

SUMMARY

A method of forming a component having grooves formed into an outer surface of a component includes the steps of applying at least one mold to an outer surface of a component preform. The mold is forced into contact with the outer surface to form a detent into the outer surface.

These and other features may be best understood from the following drawings and specification.

DETAILED DESCRIPTION

Figure 1:
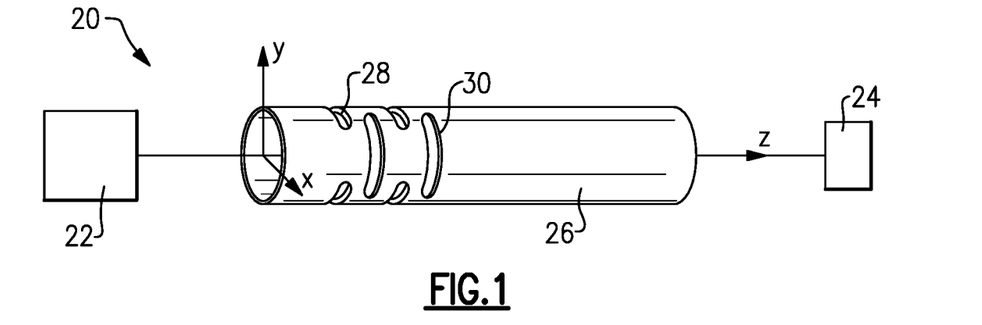
FIG. 1 shows a drive shaft in an application somewhat schematically.

FIG. 1 shows a drive arrangement 20, which drives a component 22 through a drive input 24, and having a drive shaft 26 connecting the input 24 to the output 22. A plurality of grooves 28 and 30 or detents are formed on an outer peripheral surface of a shaft portion 26. The grooves 28 and 30 extend for a limited circumferential length about an axis of rotation Z of the drive shaft 26. In fact, the grooves 28 and 30 extend for less than 180° about the axis of rotation Z.

Figure 2A:
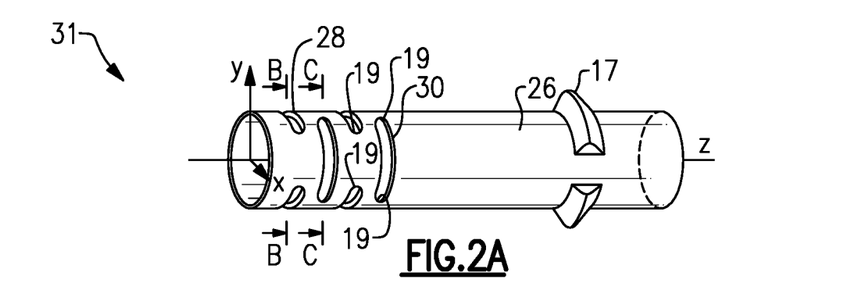
FIG. 2A shows a three-dimensional view of a drive shaft portion.

FIG. 2A shows a tubular portion 31 of the shaft 26 having the grooves or detents 28 and 30. While grooves are specifically disclosed with regard to the apparatus features of this disclosure, bumps 17 such as mentioned above which extend radially outwardly can be substituted for the grooves in all embodiments.

Figure 2B:
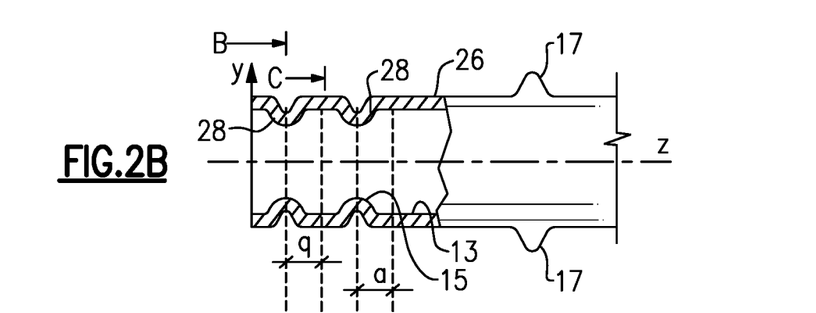
FIG. 2B is an axial cross-sectional view through a portion of the FIG. 2A drive shaft.
Figure 2C:
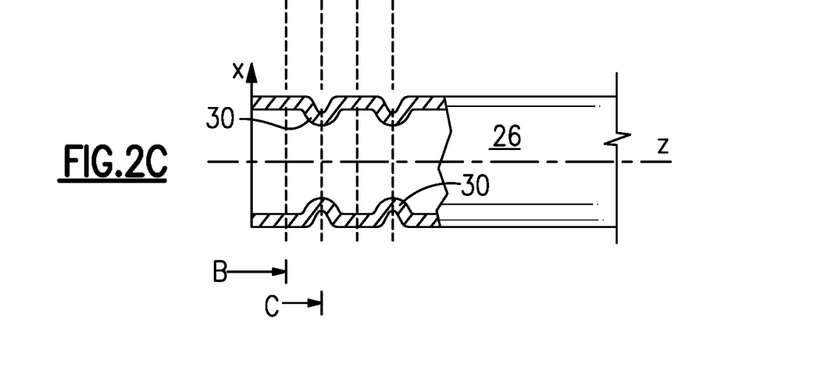
FIG. 2C is an axial cross-sectional view through a distinct portion of the FIG. 2A drive shaft.

FIG. 2B is a cross-sectional view through space portions of the repeated grooves 28. FIG. 2C is a cross-sectional view through the grooves 30. As can be appreciated from FIGS. 2A-2C, groove sets are positioned in general alignment, but spaced axially from each other. Thus, as one can see from FIGS. 2A-2C, the circumferential extent of the grooves 30 extends across a space between ends 19 of spaced grooves 28. The grooves 28 also extend through a space between the ends 19 of the grooves 30. In some embodiments, the ends 19 of the grooves 30 may extend circumferentially beyond the ends 19 of the grooves 28, and vice versa. In other embodiments, the ends 19 of the grooves 30 and the ends 19 of the grooves 28 may end before the circumferential location of the other ends 19.

As is clear the grooves deform a wall of the preform, but do not cut, or extend, through to an inner surface. As is clear from FIG. 2B, the grooves or detents 28 (although this is also true of the detents 30, and the other detents to be disclosed below) also deform an inner peripheral surface 13 of the tubular portion 31. The groove 28 is showing having an inwardly extending portion 15 deformed into the inner surface 13. On the other hand, it may be that the deformations need not extend through the entire thickness of the tubular portion 31, and do not deform, say, the inner surface 13.

Figure 3A:
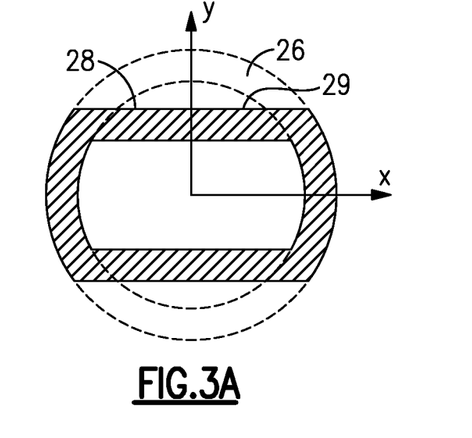
FIG. 3A is a diametric cross-sectional view along section B-B from the FIG. 2B location.
Figure 3B:
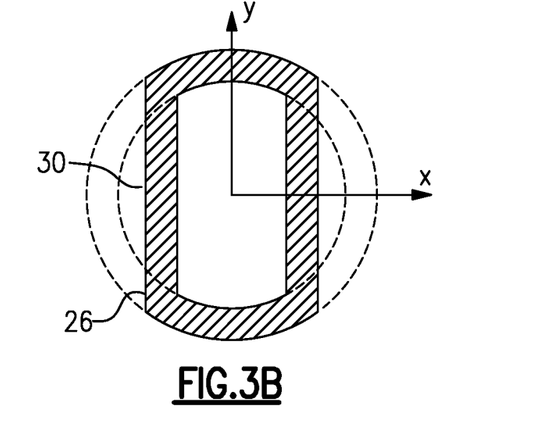
FIG. 3B is a diametric cross-sectional view along section C-C from the FIG. 2C location.

FIG. 3A shows diametric cross-section with an embodiment of a groove 28 that is relatively flat at an outer surface 29. FIG. 3B shows a similar shape to the outer surface 29 of the groove 30.

Figure 3C:
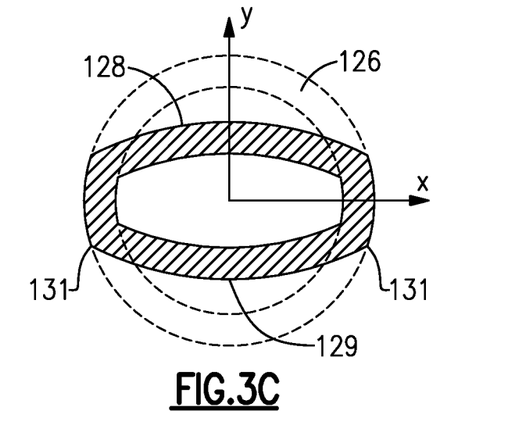
FIG. 3C is an alternative view similar to that of FIG. 3A.
Figure 3D:
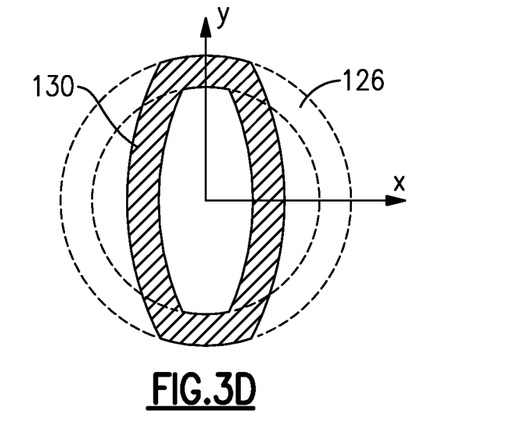
FIG. 3D is an alternative view similar to that of FIG. 3B.

FIG. 3C shows diametric cross-section with a more complex shape for a groove 128 on a drive shaft 126. Here, shape 128 has as an outermost position 129 extending to circumferential ends 131. As is clear, the deformations are formed to have a central location 129 which extends radially further away from the central axis, and the circumferential ends 131 extend in a circumferential direction toward each other FIG. 3D has a similar shape for a groove 130.

Figure 4A:
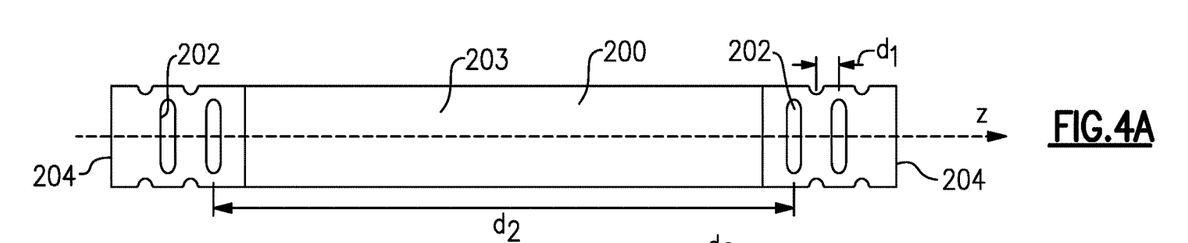
FIG. 4A shows one alternative distribution of grooves or detents along a tube axis Z.

FIG. 4A shows a first embodiment wherein there is a drive shaft 200 having a portion 203 in a central location that is generally without grooves. Portions adjacent ends 204 have groove sets 202. There are at least a plurality of grooves 202 adjacent the ends 204 spaced by a distance $d_1$. The spacing distances $d_1$ can be either the same or variable in the grooved areas. It could be said that a spacing distance $d_1$ between the grooves 202 at the end portions is greater than a distance $d_2$ between grooves across the non-groove section 203 having fewer grooves.

Figure 4B:
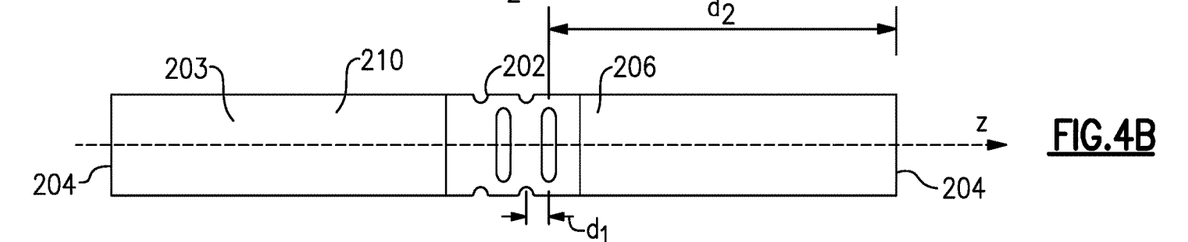
FIG. 4B shows a second alternative distribution of grooves or detents along a tube axis Z.

FIG. 4B shows a drive shaft embodiment 210 wherein a pair of non-groove portions 203 and 206 extend between the ends 204 of the drive shaft. An area with grooves 202 is shown at an intermediate location. Here again, a distance $d_1$ between a plurality of grooves in the grooved area is less than a distance between grooves in the non-grooved areas 210. The distance $d_2$ here is also greater than $d_1$.

Figure 4C:
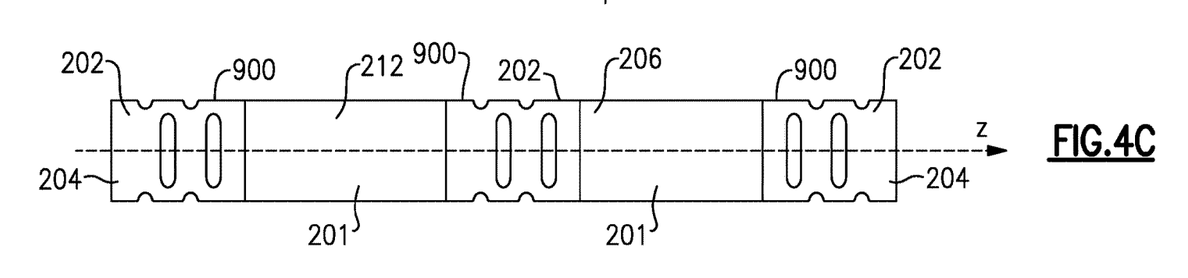
FIG. 4C shows a third alternative distribution of grooves or detents along a tube axis Z.

FIG. 4C shows a drive shaft 212 having non-grooved areas 201 with end groove portions 900 and a central groove portion 900. Here again, a distance between a plurality of grooves in each of the grooved portions 900 is less than a distance between grooves across the portions 201.

Figure 4D:
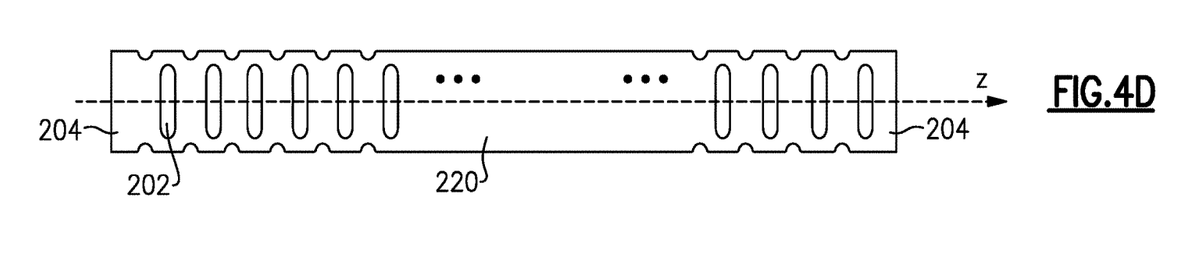
FIG. 4D shows yet another alternative distribution of grooves or detents along a tube axis Z.

FIG. 4D shows a drive shaft 220 wherein the grooves 202 are formed by uniform or variable spacing across an axial length of the drive shaft and between the axial end 204.

Figures 5A, 5B:
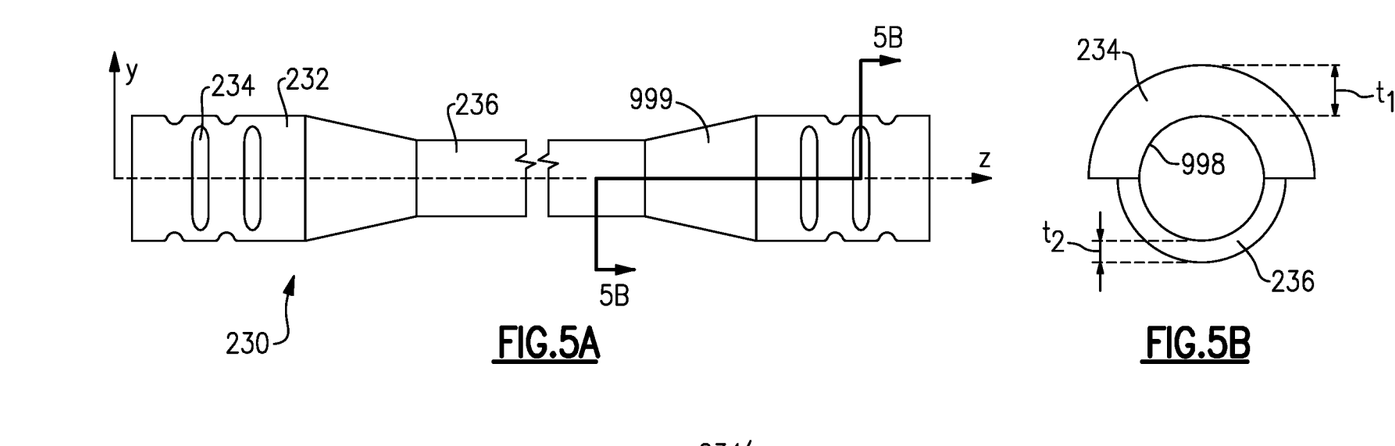
FIG. 5A shows an optional feature.
FIG. 5B is a diametric cross-sectional view along section 5B-5B from FIG. 5A.

FIG. 5A shows another potential feature wherein a drive shaft 230 has a central portion 236 which is relatively small, and end portions 232 having grooves 234 such as disclosed above. Portions 232 are either radially larger or/and thicker than the central portion 236.

As shown in FIG. 5B, this may be accomplished by either simply having the outer diameter of the portion 234 be larger than the outer diameter of the portion 236 while keeping the inner diameter 998 of the portions 236 and 234 constant. In this case, a thickness $t_1$ of the portion 234 is greater than a radial thickness $t_2$ of the portion 236. This will provide reinforcement to the area with grooves to mitigate stress concentrations due to the grooves. The groove or detent 234 is omitted from this view to simplify the section and better illustrate the relative diameters and/or thicknesses.

Figure 5C:
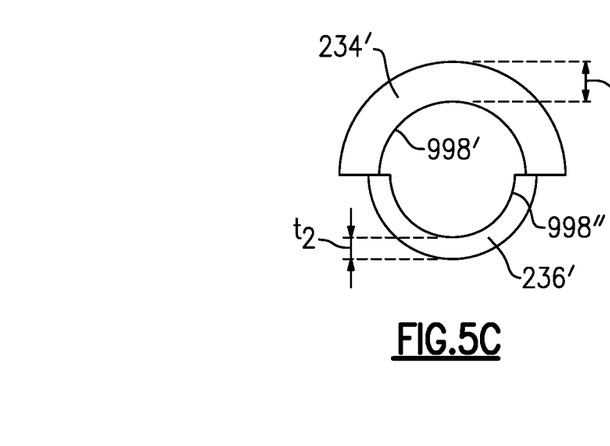
FIG. 5C is another alternative view similar to that of FIG. 5B.

FIG. 5C shows another embodiment wherein the thickness $t_1$ and $t_2$ of the sections 234' and 236' may be different and their inner diameters 998; and 998" as also different. It should be understood that the inner diameter 998 between the two sections will change in a linear or non-linear fashion as one moves from the two cross-sections of FIG. 5B. That is, in the section 999 as shown in FIG. 5A, the inner diameter will slope to accommodate the differences between the two sections 234' and 236'.

Figure 6A:
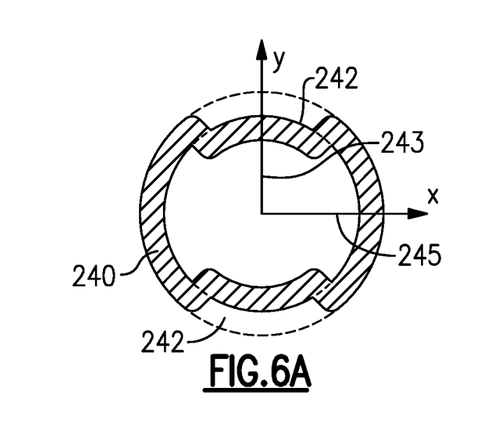
FIG. 6A shows one option in a diametric cross-sectional view
Figure 6B:
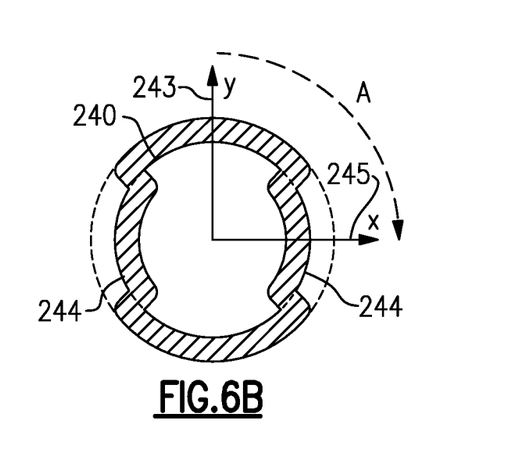
FIG. 6B shows an option associated with FIG. 6A.

FIGS. 6A and 6B show an embodiment 240 much like that illustrated above with regard to FIG. 1 wherein an embodiment 240 much like that illustrated in FIG. 1 wherein there are two groove sets 242 and 244.

FIG. 6A shows the first groove set 242 on the shaft 240 wherein the grooves 242 are centered on the axis 243.

FIG. 6B shows the second groove set 244 on the shaft 240 wherein the grooves 244 are centered on an axis 245. An angle A is defined between the axes 243 and 245, and the angle A may be approximately 90°.

Figure 6C:
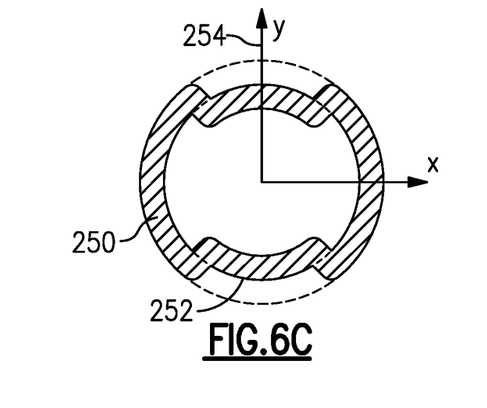
FIG. 6C shows another option in a diametric cross-sectional view.

FIG. 6C shows a drive shaft embodiment 250 having a pair of grooves 252 centered on an axis 254. In embodiment 250, there are not two axially spaced sets of grooves, but rather three.

Figure 6D:
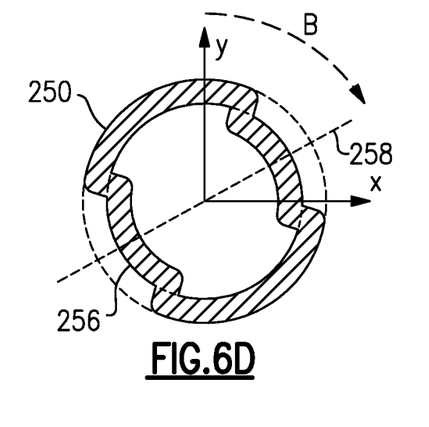
FIG. 6D shows an option associated with FIG. 6C.

FIG. 6D shows grooves 256 centered on axis 258. An angle B is defined between axes 254 and 258, and the angle B may be approximately 60°.

Figure 6E:
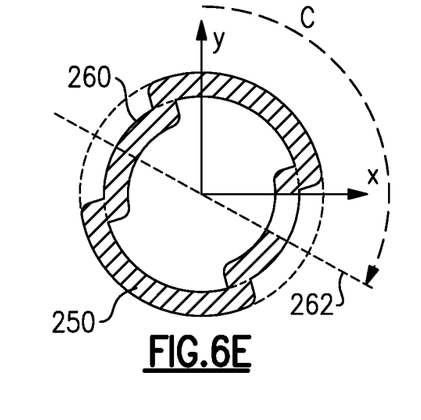
FIG. 6E shows another part of the FIGS. 6C and 6D option.

FIG. 6E shows another axially spaced cross-section of the drive shaft 250 wherein there are grooves 260 centered on an axis 262. Axis 262 is spaced from axis 243 by an angle C. Angle C may be approximately 120°, i.e. approximately twice larger than the angle B.

Embodiments with more than three sets of grooves may be used.

Figure 7A:
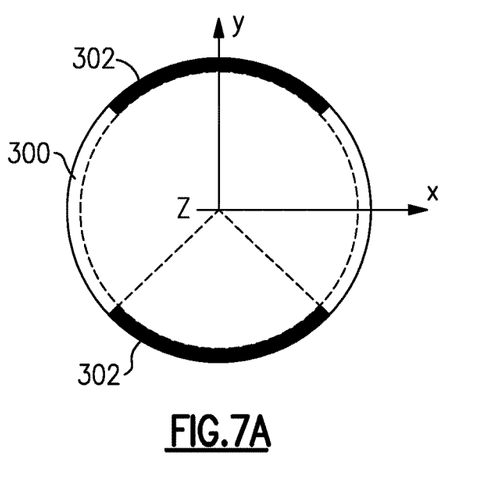
FIG. 7A shows one embodiment of an arrangement of grooves or detents along a hoop direction in a representative diametric cross-section.

FIG. 7A shows a first embodiment shaft 300 wherein there are two grooves 302 at each axial location in each groove set.

Figure 7B:
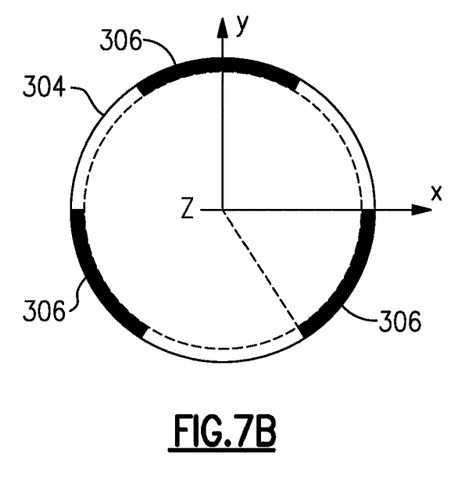
FIG. 7B shows an alternative feature of an arrangement of grooves or detents along a hoop direction in a representative diametric cross-section.

FIG. 7B shows an alternative drive shaft embodiment 304 wherein there are three circumferentially spaced grooves 306 in each groove set.

Figure 7C:
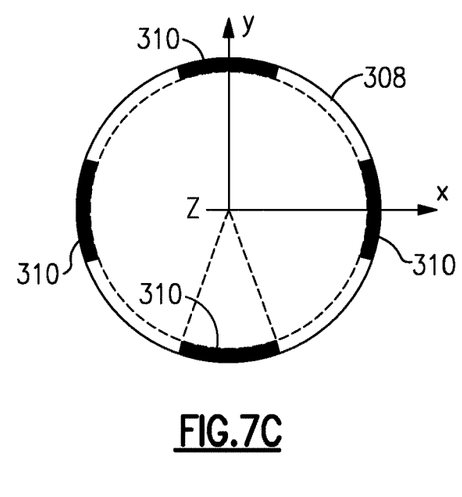
FIG. 7C shows yet another alternative of an arrangement of grooves or detents along the hoop direction in a representative diametric cross-section.

FIG. 7C shows a drive shaft embodiment 308 wherein there are four circumferentially spaced grooves 310 at each axial location in each groove set.

Of course more than four circumferentially spaced grooves could be used in each axially spaced deformation set.

The arrangement of grooves circumferentially about a shaft axis Z is similar to the arrangement when only two grooves per the section are used. For example if there are two uniformly positioned grooves shown in FIG. 7A, a diametric complimentary cross-section (FIG. 3B) a rotated at approximately 90°. Similarly in case of three the same, uniformly positioned grooves (FIG. 7B), there is a corresponding cross-section rotated at 60°. In case of four (FIG. 7C), uniformly positioned grooves, there is a similar rotation at 45°, and so on. More complex, but similar mutual arrangements can be defined if there are more than two complimentary sets of grooves, for example of a case shown in FIGS. 6C-6E for three complimentary sets.

Figure 8A:
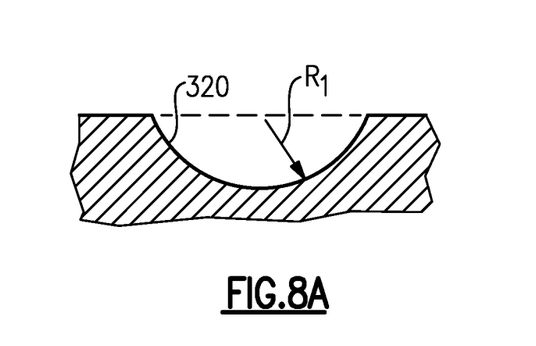
FIG. 8A shows one potential embodiment of a groove or detent cross-sectional shape.

FIG. 8A shows a first cross-sectional shape 320 for an individual groove presented in an axial cross-section of the shaft (that is, similar to the FIG. 2B section). Cross-sectional shape 320 has a generally uniform or non-uniform but concave shape and constant or variable radius $R_1$.

Figure 8B:
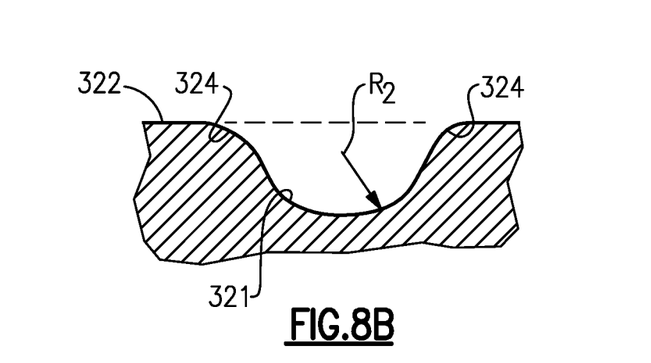
FIG. 8B shows an alternative embodiment of a groove or detent cross-sectional shape.

FIG. 8B shows an alternative shape 322 wherein there is a central concave portion 321 formed about a constant or variable radius $R_2$. There are also convex portions 324 on each side of the portion 321. There are convex segments 324 spaced on each end of the concave portion.

Figure 8C:
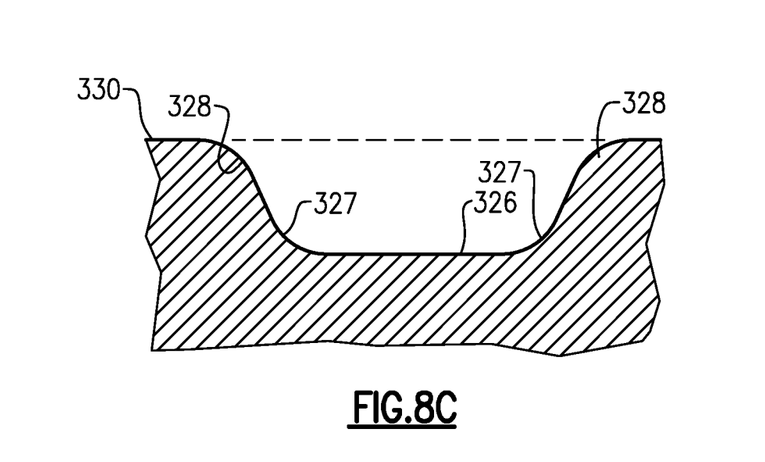
FIG. 8C shows yet another alternative embodiment of a groove or detent cross-sectional shape.

FIG. 8C shows another alternative groove shape 330 having a flat portion 326, convex end portions 328 at each end of the groove, and concave portions 327.

A drive shaft could be said to comprise a shaft portion extending between axial ends and being generally cylindrical, and hollow, and formed of a fiber reinforced thermoplastic. Grooves extend into an outer peripheral surface of the cylindrical shaft portion. The grooves extend for a circumferential extent that is less than 180° about a central axis of the tubular portion.

The shafts as disclosed above may be formed of the same or different fiber-reinforced polymer matrix composite materials. In one embodiment, the matrix can be a thermoplastic polymer. In another embodiment, the matrix can be a thermoset polymer composite. Different types of reinforcing fibers, such as, for example, carbon fibers, glass fibers, organic fibers, inorganic material (e.g. ceramic) fibers, or their combinations can be used in different embodiments. In different embodiments, the same or different fabrication processes, such as for example, automated fiber placement, filament winding, braiding, wrapping, etc. can be used to make separate composite tubes and diaphragms. Alternatively, this disclosure would also extend to metal shafts.

A method of forming such shafts is now disclosed.

Figure 9A:
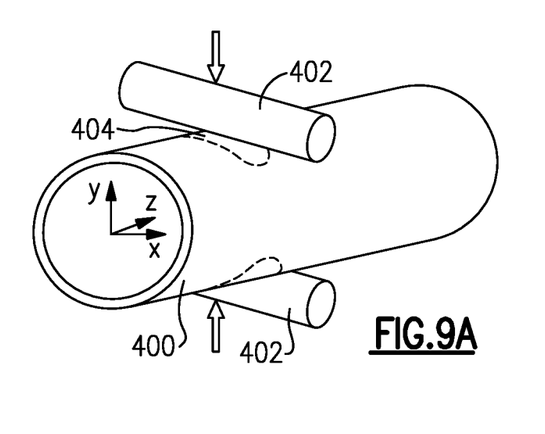
FIG. 9A shows a three-dimensional view of a fabrication step.

FIG. 9A shows a tubular portion formed of a thermoplastic shaft preform. Heated molds 402 are brought into contact with compression against the tubular preform 400 to form the grooves 404. Although heated molds are disclosed, with certain materials the molds need not be heated. As an example if a thermoplastic is used heated molds may be used. The molds need not be heated when a thermoset or metal is used. As an example, a mold may be brought into contact with a partially curved thermoset polymer composite preform shaft.

As shown in this embodiment, the molds are generally cylindrical. However, in particular and as an example only, the several shapes of the grooves or detents, as disclosed above, could inform the shape of the molds.

Figure 9B:
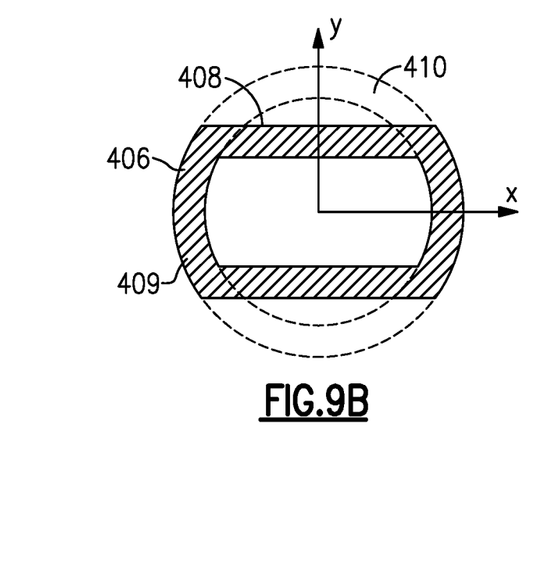
FIG. 9B shows a diametric cross-sectional view with grooves formed by the fabrication method schematically illustrated in FIG. 9A.
Figure 10A:
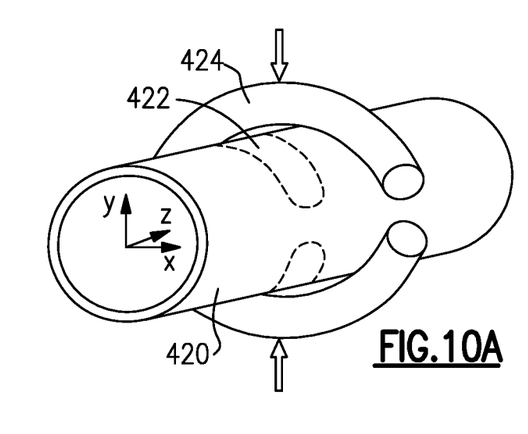
FIG. 10A shows an alternative three-dimensional view of a fabrication step.

FIG. 9B shows diametric cross-sectional view of a shaft 406 having the grooves 408 formed to be generally flat and extending between circumferentially spaced curved ends 409. This embodiment would be similar to that illustrated in FIGS. 3A and 3B FIG. 10A shows a shaft preform 420 receiving molds 424, which have a curvature to them, and which form the groove areas 422.

Figure 10B:
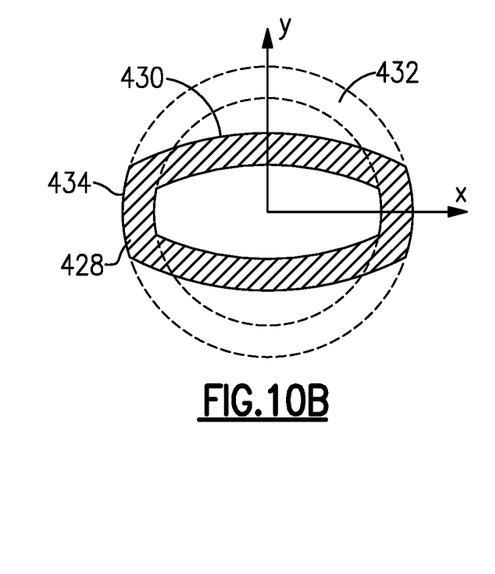
FIG. 10B shows a diametric cross-sectional view with grooves or detents formed by the fabrication method schematically illustrated in FIG. 10A.

As shown in FIG. 10B for a diametric cross-sectional view of a shaft 420, the grooves 430 on the formed shaft 428 extend between cylindrical ends 434. This embodiment would be similar to that illustrated in FIGS. 3C and 3D.

Figure 11:
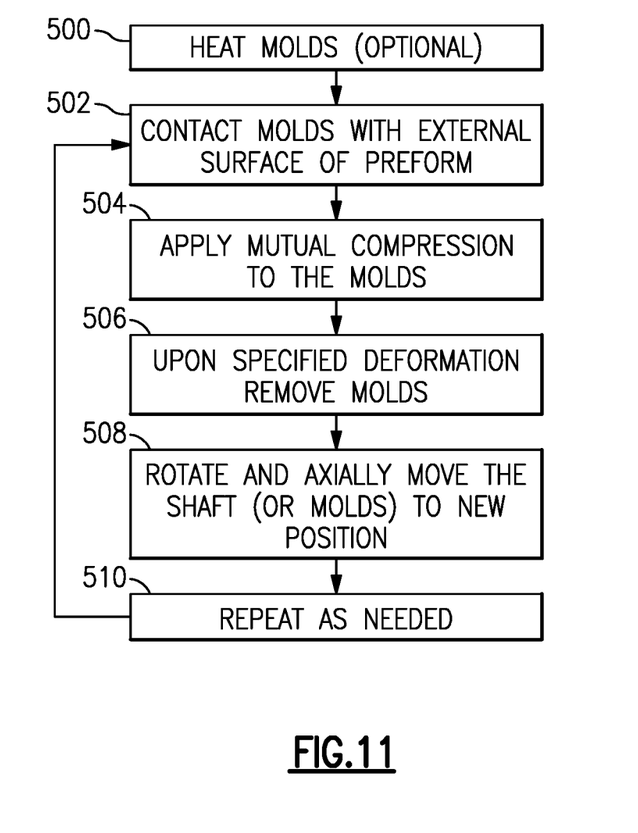
FIG. 11 is a flowchart.

FIG. 11 is a flowchart of the methods as disclosed.

In an initial step, molds are heated at step 500. Those molds are brought into contact with external surfaces of a shaft preform at step 502.

Compression is applied to the mold or molds at step 504.

Upon specified deformation being achieved, the molds are removed at step 506.

Portions of the mold may be rotated and/or moved axially to a new position at step 508. The method then returns to step 502 and is repeated as many times as necessary at step 510.

Figures 12A, 12B:
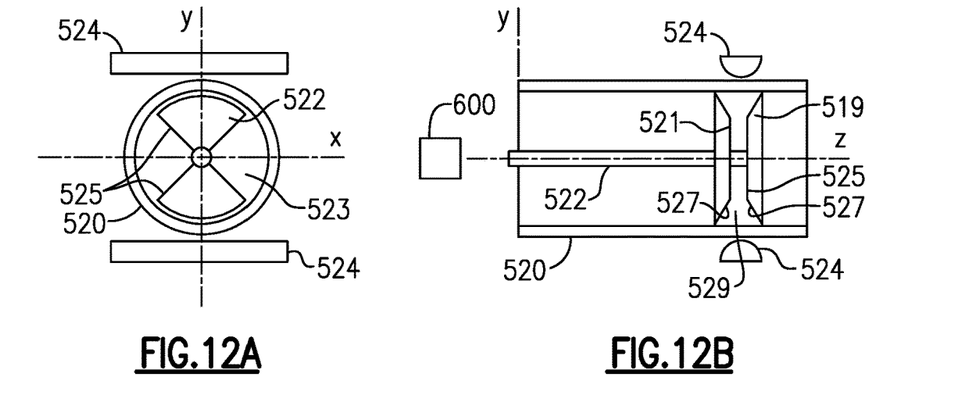
FIG. 12A shows a diametric cross-section of the first arrangement.
FIG. 12B shows an axial cross-sectional view of a first step in a method of forming a drive shaft.

FIG. 12A shows optional additional details of a mold embodiment as a diametric cross-sectional view. The molds 524 are the external heated molds such as described above. While generally cylindrical and straight molds are illustrated here, the methods to be described would also apply to the more curved molds such as shown in FIG. 10A.

The shaft preform 520 receives an internal molding support 522. Support 522 has radially outer extending portions 525 with intermediate spaces 523.

In a step illustrated in FIG. 12B as an axial cross-sectional view, the portions 525 are axially and circumferentially aligned with an area where it is desirable to form the grooves from the heated molds 524. As can be appreciated in this view, the internal support 522 actually has spaced parts 521 and 519 having internal faces 527 to deform an internal space 529. A control for the mold would move the internal support 522 such that space 529 is axially aligned with the molds 524.

Figure 12C:
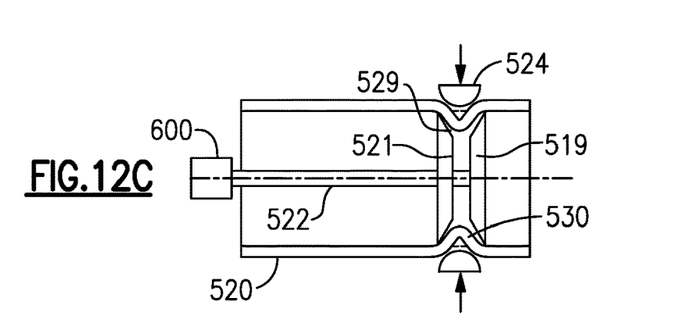
FIG. 12C shows a subsequent step.

As shown in the step of FIG. 12C as an axial cross-sectional view, compression is then applied to the heated mold portions 524 and grooves 529 and 530 are formed in the shaft preform 520, with the molds deforming the preform into grooves 530 and 529.

Figure 12D:
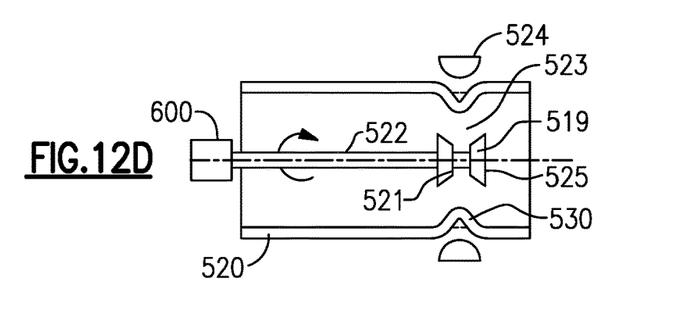
FIG. 12D shows yet another subsequent step.
Figure 12E:
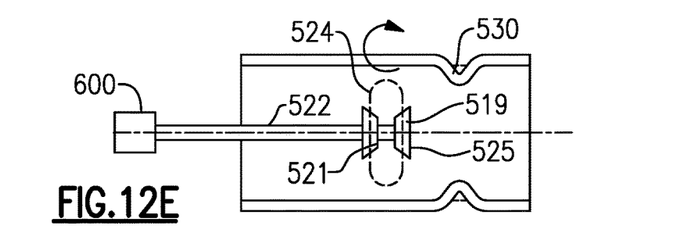
FIG. 12E shows yet another subsequent step.

FIG. 12D shows an axial cross-sectional view of a subsequent step. After the grooves 530 and 529 are formed, the internal support 522 may be rotated circumferentially such that the spaces or areas 523 are aligned with the grooves 530 and 529. This allows the mold to be moved axially as shown in FIG. 12E, and such that the portions 525 now extend into and out of the plane of FIG. 12E. Molds 524 can be moved or arranged to be aligned circumferentially with the location of the enlarged portions 525 such that a second group of grooves can be formed.

As an example and returning to FIG. 1, method step 12C may form, say the groove pairs 28, whereas method 12E may form the groove pairs 30. Of course, if more than two sets of grooves are formed, more than two steps and rotations will be utilized.

A motor 600 is shown schematically to rotate and move the support 522 axially. Alternatively, the preform could be moved. An appropriate control can operate to control the support 522 and the heated molds in cooperation to form the grooves.

Figure 13A:
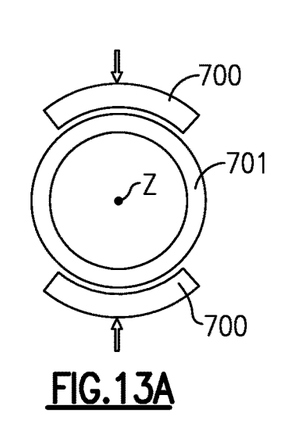
FIG. 13A shows a first heated mold option.
Figure 13B:
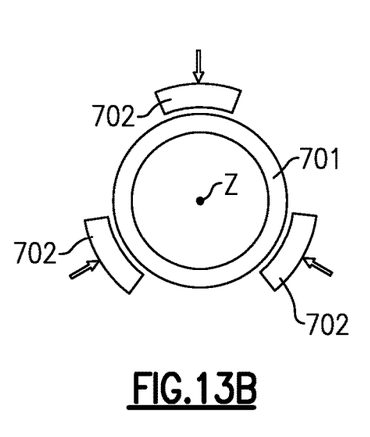
FIG. 13B shows an alternative heated mold option.
Figure 13C:
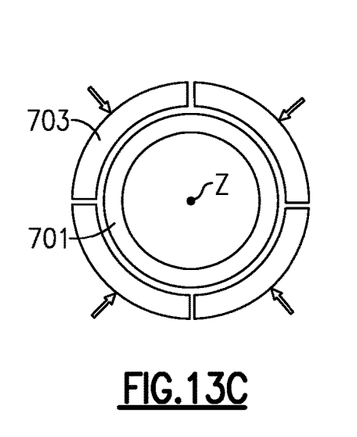
FIG. 13C shows yet a third heated mold option.

FIGS. 13A-13C show diametric cross-sectional views. FIG. 13A shows a method embodiment wherein there are two heated molds 700 spaced about a tubular preform 701.

FIG. 13B shows an embodiment wherein there are three heated molds 702 spaced circumferentially about a preform 701.

FIG. 13C shows an embodiment wherein there are four heated molds 703 spaced about a preform 701. It should be understood that the embodiments of FIG. 13A, 13B, or 13C may also form a groove which extends about the entire 360° in the circumferential direction if needed.

Figure 14A:
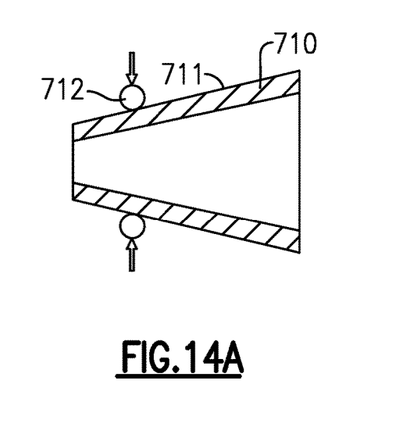
FIG. 14A show a component which may be formed by the methods disclosed in this application which may be for a use other than a drive shaft.
Figure 14B:
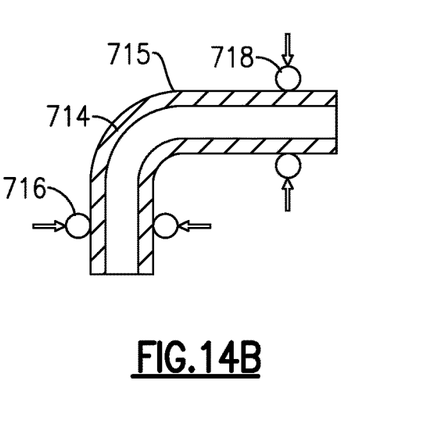
FIG. 14B shows yet another component which may be formed by the methods of this application.

FIGS. 14A and 14B show axial cross-sectional views. FIG. 14A shows a non-cylindrical component 710 which may be made with the methods as described above. Grooves are formed into an outer surface 711 by heated molds 712 in a manner similar to that disclosed above. The component 710 could be any number of aerospace components, or could be components for other applications.

FIG. 14B shows a non-cylindrical component 714 with curved segments. Heated molds 716 and 718 are applied to form grooves into an outer peripheral surface 715, again according to methods as described above.

A method of forming a component having grooves formed into an outer surface of a component includes the steps of forming a component preform. The method then applies at least one mold to an outer peripheral surface of the component preform. A force forces the at least one mold into contact with the outer peripheral surface to form a groove into the outer peripheral surfaces.

Methods, such as disclosed above, are claimed in co-pending U.S. patent application Ser. No. 16/247,856, filed on even date herewith, and entitled "Drive Shafts With Enhanced Bending Flexibility."

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of forming a component having grooves formed a into an outer surface comprising steps of:
applying at least one mold to an outer surface of a component preform, forcing said at least one mold into contact with said outer surface to form a detent into said outer surface of said component preform;
wherein there are at least a pair of said at least one mold brought into contact with said component preform, and circumferentially spaced;
wherein said component preform is a generally tubular cylindrical structure and said outer surface is an outer peripheral surface;
wherein said molds are brought into contact with said outer peripheral surface to form circumferentially spaced detents in said component preform;
wherein said molds are removed from said outer surface of said component preform after forming said detents; and
wherein said component preform is hollow and an internal mold support operates in cooperation with said molds to form said detents, and one of said internal mold support and said component preform is moved relative to the other after said detents are formed.

2. The method as set forth in claim 1, wherein said internal mold support has enlarged circumferentially spaced portions and with circumferentially intermediate spaces.

3. The method as set forth in claim 2, wherein said internal mold support is brought to be axially aligned with said molds and said enlarged internal circumferentially spaced portions are circumferentially aligned with said molds, said molds being brought into contact with said outer peripheral surface of said component preform to force a wall of said components preform into a space between said enlarged internal circumferentially spaced portions.

4. The method as set forth in claim 3, wherein said enlarged internal circumferentially spaced portions each include a pair of axially spaced internal mold portions with an intermediate space, said wall of said component preform deformed into said intermediate space.

5. The method as set forth in claim 4, wherein said pair of axially spaced internal mold portions having facing conical surfaces to define said intermediate space.

6. The method as set forth in claim 5, wherein after said detents are formed at a first axial location, one of said internal mold support and said component preform is rotated such that said circumferential spaces between said enlarged internal circumferentially spaced portion are now circumferentially aligned with said detents as a formed by step, and one of said internal mold support and said component preform is moved axially, such that said molds can now be aligned with said enlarged internal circumferentially spaced portions, and said molds can now be brought into contact with an outer surface of said component preform to form a second axially spaced set of detents in said component preform at a second axial location.

7. The method as set forth in claim 1, wherein said component preform is a generally tubular cylindrical structure and said outer surface is an outer peripheral surface.

8. The method as set forth in claim 7, wherein said at least one mold is brought into contact with said outer peripheral surface to form circumferentially spaced detents in said component preform.

9. The method as set forth in claim 1, wherein said component preform is hollow and an internal mold support operates in cooperation with said at least one mold to form said detents.

10. The method as set forth in claim 9, wherein said internal mold support has enlarged circumferentially spaced portions and with circumferentially intermediate spaces.

11. The method as set forth in claim 10, wherein there are at least two of said at least one molds, and said internal mold support is brought to be axially aligned with said molds and said enlarged internal circumferentially spaced portions are circumferentially aligned with said molds, said molds being brought into contact with said outer peripheral surface of said component preform to force a wall of said components preform into a space between said enlarged internal circumferentially spaced portions.

12. The method as set forth in claim 11, wherein said enlarged internal circumferentially spaced portions each include a pair of axially spaced internal mold portions with an intermediate space, said wall of said component preform deformed into said intermediate space.

13. The method as set forth in claim 12, wherein said pair of axially spaced internal mold portions having facing conical surfaces to define said intermediate space.

14. The method as set forth in claim 13, wherein after said detents are formed at a first axial location, one of said internal mold support and said component preform is rotated such that said circumferential spaces between said enlarged internal circumferentially spaced portion are now circumferentially aligned with said grooves as a formed by step, and one of said internal mold support and said component preform is moved axially, such that molds can now be aligned with said enlarged internal circumferentially spaced portions, and said molds can now be brought into contact with an outer surface of said component preform to form a second axially spaced set of detents in said component preform at a second axial location.

15. A method of forming a component having grooves formed into an outer surface a comprising steps of:
applying at least one mold to an outer surface of a component preform, forcing said at least one mold into contact with said outer surface to form a detent into said outer surface of said component preform;
wherein said component preform is hollow and an internal mold support operates in cooperation with said at least one mold to form said detents;
wherein said internal mold support has enlarged circumferentially spaced portions and with circumferentially intermediate spaces;
wherein there are at least two of said at least one molds, and said internal mold support is brought to be axially aligned with said molds and said enlarged internal circumferentially spaced portions are circumferentially aligned with said molds, said molds being brought into contact with said outer peripheral surface of said component preform to force a wall of said components preform into a space between said enlarged internal circumferentially spaced portions;

wherein said enlarged internal circumferentially spaced portions each include a pair of axially spaced internal mold portions with an intermediate space, said wall of said component preform deformed into said intermediate space;

wherein said pair of axially spaced internal mold portions having facing conical surfaces to define said intermediate space; and wherein after said detents are formed at a first axial location, one of said internal mold support and said component preform is rotated such that said circumferential spaces between said enlarged internal circumferentially spaced portion are now circumferentially aligned with said a grooves as formed by step, and one of said internal mold support and said component preform is moved axially, such that molds can now be aligned with said enlarged internal circumferentially spaced portions, and said molds can now be brought into contact with an outer surface of said component preform to form a second axially spaced set of detents in said component preform at a second axial location.

* * * * *